(12) United States Patent
Eisenbraun

(10) Patent No.: US 8,919,877 B2
(45) Date of Patent: Dec. 30, 2014

(54) HEAD RESTRAINT FOR A VEHICLE SEAT

(71) Applicant: GM Global Technology Operations LLC, Detroit, MI (US)

(72) Inventor: Jonas Eisenbraun, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 66 days.

(21) Appl. No.: 13/739,726

(22) Filed: Jan. 11, 2013

(65) Prior Publication Data

US 2013/0187427 A1  Jul. 25, 2013

(30) Foreign Application Priority Data

Jan. 12, 2012 (DE) .......................... 10 2012 000 426

(51) Int. Cl.
*B60N 2/42* (2006.01)
*B60N 2/48* (2006.01)

(52) U.S. Cl.
CPC ................ *B60N 2/48* (2013.01); *B60N 2/4885* (2013.01)
USPC ..................................... 297/216.12; 297/391

(58) Field of Classification Search
USPC .............................................. 297/216.12, 391
See application file for complete search history.

(56) References Cited

U.S. PATENT DOCUMENTS

| | | | | |
|---|---|---|---|---|
| 3,205,005 A * | 9/1965 | Brown | 297/216.12 X |
| 3,650,561 A * | 3/1972 | Faust et al. | 297/391 |
| 3,706,472 A * | 12/1972 | Mertens | 297/397 |
| 4,744,601 A * | 5/1988 | Nakanishi | 297/216.12 X |
| 4,890,885 A * | 1/1990 | Grossmann | 297/284.1 |
| 5,154,477 A * | 10/1992 | Lacy | 297/397 |
| 5,181,763 A * | 1/1993 | Dellanno et al. | 297/391 |
| 5,290,091 A * | 3/1994 | Dellanno et al. | 297/216.12 X |
| 6,042,145 A * | 3/2000 | Mitschelen et al. | 280/735 |
| 6,402,238 B1 * | 6/2002 | Bigi et al. | 297/216.12 |
| 6,669,300 B1 * | 12/2003 | Lee | 297/397 |
| 7,090,292 B2 * | 8/2006 | Dellanno | 297/216.12 |
| 7,588,115 B2 * | 9/2009 | Breed | 180/271 |
| 7,604,080 B2 * | 10/2009 | Breed | 180/274 |
| 7,926,871 B2 | 4/2011 | Meixner et al. | |
| 8,469,445 B2 * | 6/2013 | Hertl | 297/216.12 |
| 8,573,701 B2 * | 11/2013 | Yetukuri et al. | 297/216.12 X |
| 8,651,570 B2 * | 2/2014 | Brucato | 297/216.12 |
| 2005/0006941 A1 * | 1/2005 | Park | 297/406 |
| 2009/0315372 A1 * | 12/2009 | Tracht | 297/216.12 |

FOREIGN PATENT DOCUMENTS

| | | |
|---|---|---|
| DE | 3520803 A1 | 12/1986 |
| DE | 29612504 U1 | 9/1996 |
| DE | 10045070 A1 | 3/2002 |
| WO | 2006136485 A1 | 12/2006 |

* cited by examiner

*Primary Examiner* — Rodney B White
(74) *Attorney, Agent, or Firm* — Ingrassia Fisher & Lorenz, P.C.

(57) ABSTRACT

A head restraint for a vehicle seat is provided. The head restraint includes a basic body and a foam body surrounding the basic body. The foam body at a front has a contact surface for a head of a person using the vehicle seat, and a front surface of the basic body facing the contact surface has a vertically running concave curvature. The basic body in a region of an upper end of the contact surface comprises a ramp, which, with respect to a portion of the front surface of the basic body arranged below this upper end, is directed towards the front.

19 Claims, 3 Drawing Sheets

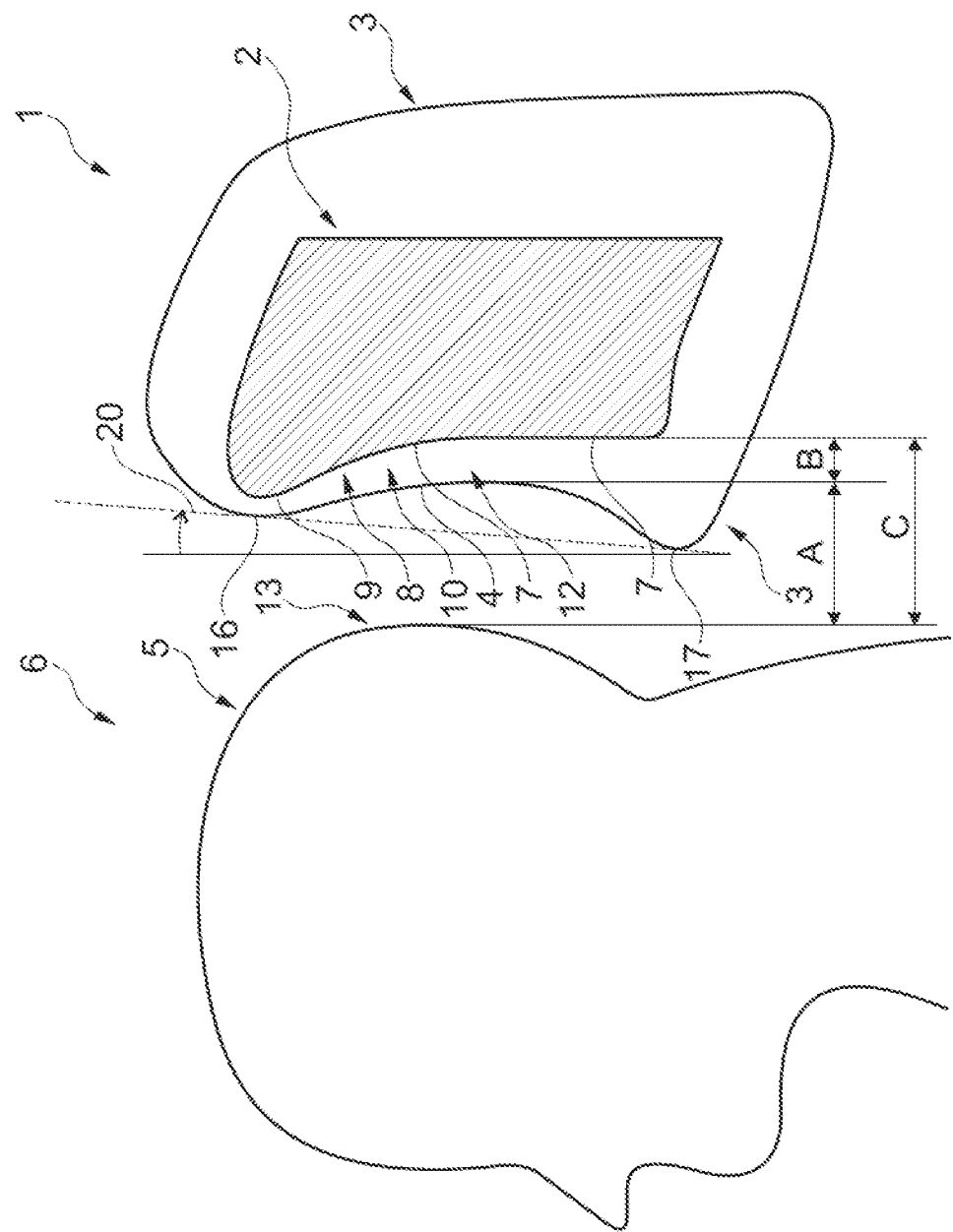

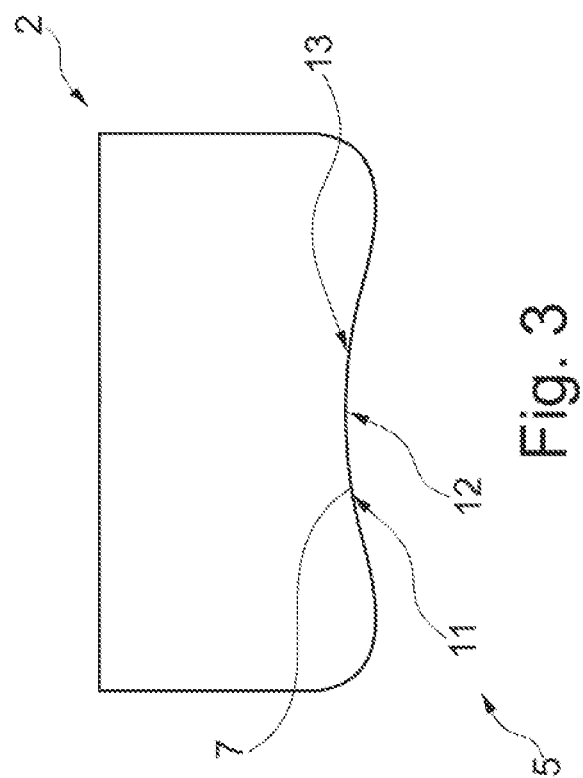
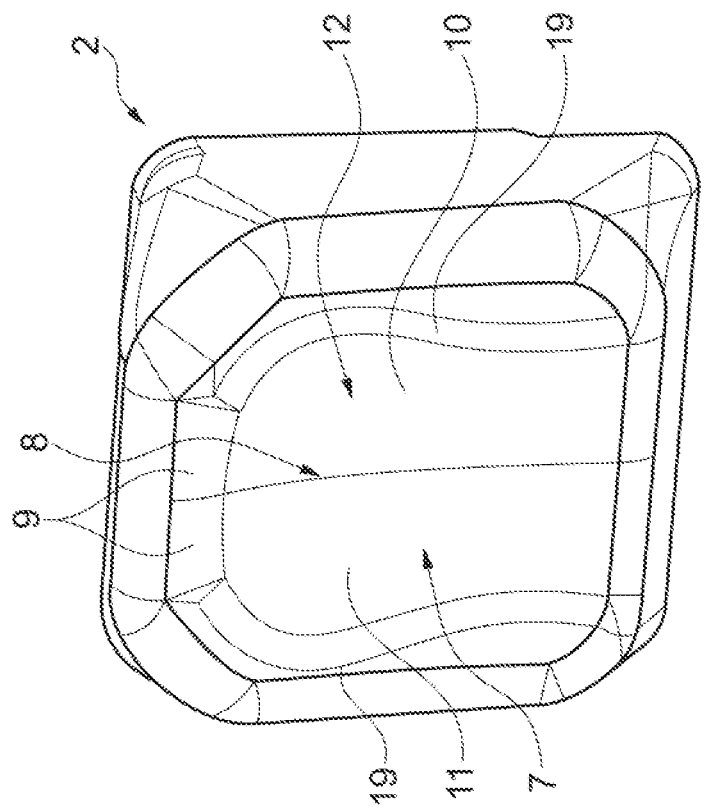

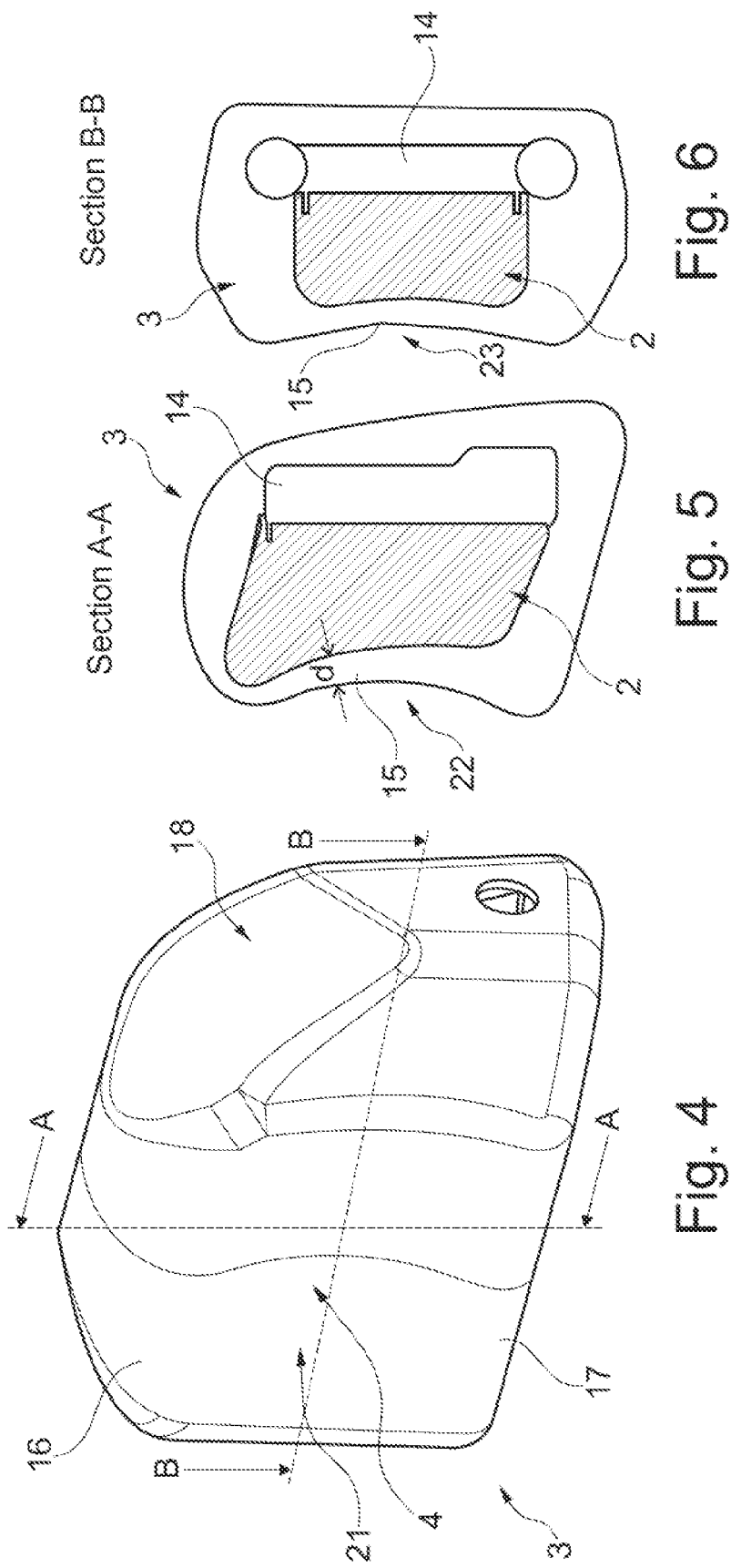

HEAD RESTRAINT FOR A VEHICLE SEAT

CROSS-REFERENCE TO RELATED APPLICATION

This application claims priority to German Patent Application No. 102012000426.5, filed Jan. 12, 2012, which is incorporated herein by reference in its entirety.

TECHNICAL FIELD

The technical field relates to a head restraint for a vehicle seat, in particular for a backrest of a motor vehicle seat.

BACKGROUND

In the case of motor vehicles, the vehicle seats are almost exclusively configured so that their backrests comprise head restraints. Here, the head restraint is mostly designed as a separate construction element, which is inserted into mountings of the backrest via head restraint rods. Alternatively, the head restraint can constitute a construction unit with the backrest. Thus, the head restraint presents itself quasi as extension of the backrest towards the top. Conventional two-way passive head restraints or active head restraint systems, in particular four-way head restraints with engageable horizontal adjustment, are employed.

From WO 2006/136485 A a head restraint is known, which in the event of a rear-end impact on the motor vehicle, is designed fixed relative to the backrest and thus in a way of a conventional head restraint, or is designed so that at least a part of the head restraint can be immediately displaced in the direction of the vehicle occupant, by means of which this is designed as active head restraint. This head restraint comprises a basic body and a foam body surrounding the latter. At the front, the foam body has a contact surface for the head of a person using the vehicle seat, wherein this contact surface has a vertically running convex curvature. In the region of a front surface facing the contact surface of the foam body, the basic body also has a vertically running convex curvature. Between contact surface of the foam body and front surface of the basic body the foam body is designed relatively thick, in particular in the region of the front end of the basic body. This convex design of the front surface of the basic body, which in the region of the upper end is arranged further back than in the region of the vertical center of the front surface of the basic body, requires that upon an impacting of the head of a vehicle occupant due to an accident, the head, upon compression of the foam body in the region of the front end of the front surface of the basic body, can slide off towards the top and in the process the head is additionally subjected to a tilting moment about a horizontal axis.

SUMMARY

At least one object herein is to create a head restraint for a vehicle seat, in particular for a backrest of a motor vehicle seat, which in the case of a vehicle accident with force acting on the head of the vehicle occupant in the direction of the head restraint ensures that the head, when contacting the head restraint, is not moved by the head restraint about a horizontal axis or transverse axis of the head and beyond the head restraint, increasing the risk of injuring the person. The head restraint of the present disclosure is applicable to all conceivable head restraints or head restraint systems, in particular when designed as two-way passive head restraint.

The head restraint as contemplated herein comprises a basic body and a foam body surrounding the latter. The foam body comprises a contact surface at the front for the head of a person using the vehicle seat, furthermore a front surface of the basic body facing the contact surface, which is provided with a vertically running convex curvature. In the region of the upper end of the contact surface of the foam body, the basic body comprises a ramp which with respect to a portion of the front surface of the basic body arranged below this end, is directed towards the front.

In the case of a vehicle accident with force acting on the head of the vehicle occupant in the direction of the head restraint, the ramp thus prevents that the head with respect to the head restraint moves towards the top and the prevention of this movement in interaction with the design of the basic body with the vertically running convex curvature results in that the introduction of a moment into the head about a horizontal axis is substantially reduced. This sustainably reduces the risk of the so-called whiplash effect with a serious cervical vertebrae injury of the person.

The design of the basic body with the head restraint herein is therefore particularly important since in the case of an accident event, and action of the head of the vehicle occupant on the head restraint that takes place as a consequence, the foam body surrounding the basic body is largely compressed so that the shape of the foam body has to be primarily seen under the aspect of the optimal comfort of the head restraint for the vehicle occupant in normal operation of the head restraint, thus outside an accident event.

Accordingly, the special objective must be seen in creating a head restraint which optimally fulfills the safety requirements on the one hand and, outside of the accident event, offers a maximum comfort for the vehicle occupant on the other hand. Moreover, this head restraint does not require any major mechanical effort, in particular no lockable adjustment or active enforcement guides.

In an exemplary embodiment, the basic body is designed stiff. It is thus designed so hard that it is not deformed during an accident event under the action of the head.

In one embodiment, the basic body is designed in one piece. It consists in particular of plastic. This can be a plastic injection molding. This makes it possible to produce the contour of the basic body in a simple manner.

According to an exemplary embodiment, the basic body on the side facing the contact surface comprises a depression having the vertically running curvature and a horizontally running curvature. The vertically running curvature in connection with the ramp ensures that the movement of the head with respect to the basic body during the accident event and thus with respect to the head restraint is limited towards the top while the horizontally running curvature in the basic body during the accident event guides or positions the head on both sides so that the head with respect to the head restraint cannot move away to the side. It is thus prevented that during the accident event a moment is introduced into the head which leads to a rotation of the head, thus to a movement of the head about a substantially vertical axis.

Since the design of the basic body with the upper ramp is important, it is quite adequate when the surface of the basic body in a lower portion is arranged substantially vertically. In particular, the surface of the basic body in the region of the lower half of the basic body is substantially arranged vertically.

In principle it is sufficient when the basic body is surrounded by the foam body only in the region of its end facing the head of the vehicle occupant. However, it is also considered particularly advantageous under the production aspect when the basic body is completely surrounded by the foam body.

In an embodiment, the ramp extends at least over the middle width region of the basic body in the region of its upper end. In the case of an accident event with action of the head on the head restraint, the head is thus prevented from giving way towards the top. The ramp prevents this. In particular, the front end of the ramp runs along a horizontal.

As explained above, the thickness of the foam body must be primarily seen under the aspect of the comfort for the vehicle occupant outside the accident event. Accordingly, for the sake of minimizing the weight of the head restraint, there is an aim to keep the thickness of the foam body as low as possible. In this regard, in an embodiment, the thickness of the foam body in the region of the ramp is smaller than the thickness of the foam body in the region of the contact surface located below the ramp. In particular, the foam body is configured so that the thickness of the foam body tapers from the region of the ramp as far as to the lower end of the basic body.

In one embodiment, the thickness of the foam body between the ramp of the basic body and the contact surface of the foam body amounts to about 8 to about 10 mm and the thickness of the foam body from the ramp as far as to the vertical center of the surface of the basic body increases to about 12 to about 18 mm. As far as to the vertical lower end of the surface of the basic body, the thickness of the foam body can actually increase to up to about 25 to about 30 mm. The middle region of the foam body is thus provided there, where a comfortable contact of the head of the vehicle occupant outside the accident event is important.

Under the aspect of forming the head restraint with the ramp, and also for comfort reasons, in an embodiment, the foam body in the region of the front support surface comprises a protrusion directed towards the front at the top and a protrusion directed towards the front at the bottom. Here, it is provided in particular that a line touching the protrusions is arranged at an angle of ≥ than 0°, preferentially ≥10°, in particular of about 10 to about 20°, maximum of about 30° to the vertical, wherein at an angle >0° the lower protrusion should be arranged in front of the upper protrusion. Thus, the head restraint can actually assume an inclined position to the vertical, wherein it is still ensured, because of the formation of the ramp that the head of the occupant during the accident event does not move vertically upwards and pivots about a horizontal axis in an uncontrolled manner.

For comfort reasons and under the aspect of guiding the head during the impacting on the head restraint during an accident event, in an embodiment, the foam body in the region of the front support surface has a horizontal, concave and/or vertical, concave curvature adapted to the curvature of the head of the vehicle occupant in its region at the back of the head. The contour of the foam body in the region of the front support surface is thus spatially adapted approximately to the curvature of the region at the back of the head of the vehicle occupant.

BRIEF DESCRIPTION OF THE DRAWINGS

The various embodiments will hereinafter be described in conjunction with the following drawing figures, wherein like numerals denote like elements, and wherein:

FIG. 1 is a longitudinal center section through the head restraint according to an exemplary embodiment with the head of a vehicle occupant arranged in a comfortable posture in front of the head restraint;

FIG. 2 is a spatial view of the basic body of the head restraint of FIG. 1 seen from the front in the direction of its contact surface for the head of the vehicle occupant;

FIG. 3 is a horizontal section through the basic body of the head restraint of FIG. 1, sectioned approximately at half the height of the basic body with the back of the head of the vehicle occupant assigned to the basic body during an accident event;

FIG. 4 is a spatial view of the foam body of the head restraint of FIG. 1, substantially seen from the front, wherein the foam body accommodates the basic body;

FIG. 5 is a section according to the line A-A in FIG. 4 through the foam body and the basic body, and FIG. 6 is a section according to the line B-B in FIG. 4 through the foam body and the basic body.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

In an exemplary embodiment, FIG. 1 illustrates the head restraint 1 for a backrest of a motor vehicle seat which is not shown. The head restraint 1 comprises a stiff basic body 2 and a foam body 3 completely surrounding the latter. With reference to the orientation in the motor vehicle, the foam body 3 comprises a contact surface 4 for the head 5 of a person 6 using the vehicle seat at the front. Furthermore, a front surface 7 of the basic body 2 facing the contact surface 4 comprises a vertically running concave curvature 8. In the region of the upper end of the contact surface 4, the basic body 2 comprises a ramp 9. The ramp is directed towards the front relative to a portion 10 of the front surface 7 of the basic body 2 arranged below this end.

The basic body 2 is designed as a one-piece plastic injection molding. It does not only comprise the vertically running concave curvature 8 but also a horizontally running concave curvature 11. Through these two curvatures 8 and 11, a depression 12 is formed in the basic body 2 in the region of its front surface 7, which is adapted to the contour of the region at the back of the head 13 of the head 5 of the person 6.

As is complementarily evident from the representation of FIGS. 2 and 3, the surface 7 of the basic body 2 is substantially arranged vertically in a lower portion, concretely in the region of the lower half of the basic body 2.

The ramp 9 extends in width direction of the basic body 2, thus with respect to the orientation in the vehicle, in a middle width region of the basic body 2, towards sides of the vehicle facing away, wherein the ramp 9 can actually extend over the entire width of the basic body 2 in the region of its upper end. The front end of the ramp 9 runs along a horizontal.

As is evident from FIG. 1 and complementarily to the representation of FIGS. 4 to 6, the foam body 3 encloses the basic body 2 in a closely hugging manner as shown with respect to FIG. 1, or according to a minor modification according to FIGS. 4 to 6, a hollow space 14 is formed on the back side of the basic body 2 between the latter and the foam body 3. Because of the positive connection between basic body 2 and foam body 3, the basic body 2 is connected to the foam body 3 in a fixed manner. It can thus not move away to the back from the front wall 15 of the foam body 3, comprising the contact surface 4.

As is illustrated in FIG. 1 and complementarily in FIGS. 4 and 5, the thickness of the foam body 3, concretely of the front wall 15 of the foam body 3, is smaller in the region of the ramp than the thickness of the foam body 3 in the region of the front wall 15, which is located below the ramp 9. Concretely, in principle, the thickness d of the foam body 3 in the region of the front wall 15 can increase from the region of the ramp 9 as far as to the lower end of the basic body 2 or the lower end of the front wall. In an embodiment, the thickness d of the foam body 3 in the region of the front wall 15 is about 8 to about 10 mm between the ramp 9 of the basic body and the contact surface 4 of the foam body 3 and the thickness of the foam body 3 from the ramp 9 to the radical center of the surface 7 of the foam body 2 increases to up to about 12 to about 18 mm, in particular, the thickness of the foam body 3 from the ramp 9 as far as to the vertical lower end of the surface 7 of the basic body 2 increases to up to about 25 to about 30 mm. These thickness ratios are approximately shown in FIG. 1.

In an embodiment, in the region of the front contact surface 4, the foam body 3 is provided at the top with a protrusion 16 directed towards the front and with a protrusion 17 directed towards the front at the bottom. At the top, towards the side, the foam body 3 has an inclined i.e. flattened outer portion 18.

FIG. 1 shows the position of the head 5 or the area at the back of the head 13 of the vehicle occupant 6 outside an accident event, thus in the normal state. Here, the head 5 as a rule will be located by the dimension A in front of the maximally deepened front region of the foam body 3. The dimension B indicates the minimal thickness of the foam body 3 in the region of the contact surface 4, which ensures an adequate comfort during the intended placing of the head 5 against the head restraint 1, thus outside an accident event. The dimension C represents the spacing of head 5 and deepened region of the basic body 2 that is required in safety-relevant terms. The optimized dimensions A and B require a minimal head displacement during the accident event, than, when the head 5 is moved in the direction of the head restraint 1. The function of the basic body 2 and the contour of the foam body 3 in the region of the foam body 3 facing the head 5 create an optimal balance between the optimization of the whiplash problem and the comfort requirement. Here, the ramp 9 on the basic body 2 prevents a movement towards the top during the whiplash. The horizontal, concave curvature 11 of the front surface 7 of the basic body 2 and the concomitant formation of ramps 19 located laterally of the depression 12 prevents a lateral movement of the head 5 with respect to the head restraint 1 during the whiplash and moreover reduces the volume of the foam body 3, which is advantageous in terms of weight.

The depression 12 in the basic body 2 makes it possible to position the foam body in this region with an adequate thickness commensurate with the comfort there. In this region, the contour of the depression 12 runs away from the region at the back of the head 13.

In the region of its front surface 4, the foam body 3 is configured with a contour that substantially corresponds to the contour of the head 5 in the region at the back of the head 13. Accordingly, a depression 21 is defined by the contact surface 4, which comprises a vertical concave curvature 22 and a horizontal concave curvature 23, in accordance with an embodiment.

The vertical continuous line and the interrupted line arranged at an angle to the former illustrate an angle of approximately 10° between the two lines, wherein the interrupted line is tangent to the upper protrusion 16 and the lower protrusion 17 of the foam body 3, so that the inclination of the front region of the head restraint 1 or of the front region of the foam body 3 is illustrated by this. This line 20 touching the protrusions 16 and 17 in the exemplary embodiment runs at an angle of 10° to the vertical, wherein the upper protrusion 16, based on a vertical projection, is arranged behind the lower protrusion 17. The contact surface 4 of the foam body 3, thus the foam body 3 preferentially follows the contour of the back of the head, as is evident from FIG. 1. The contour of the front surface 7 of the basic body 2 in the lower half does not follow the contour of the back of the head but distances itself from the latter towards the bottom, so that towards the bottom the foam body 3 in the region of the support surface 4 can have an increasingly greater thickness d. This is an advantage under comfort aspects. It is not required that in the lower region of the basic body 3, which faces the head 5, a support in the manner of the ramp 9 is provided, since the lower region of the basic body 2 is not whiplash-relevant. The lower protrusion 17, which is padded, is particularly well suited for supporting the person 6 in the region of the neck.

A further positive effect of the configuration of the head restraint 1 according to an embodiment is that the person 6 will set up the head restraint 1 in the intended, optimal position when the head restraint 1 is adjusted too low, since in this excessively low position, the ramp 9 is perceived as an irritation.

The shown embodiments merely show possible configurations of the head restraint, in addition to which numerous further versions are conceivable and within the scope thereof. The exemplarily shown embodiments must not be interpreted in any manner as restrictive with respect to the scope, the applicability or the configuration possibilities of the head restraint. The present description merely shows the person skilled in the art a possible implementation of an exemplary embodiment according to the invention. A wide range of modifications can be carried out on the function and arrangement of described elements without leaving the scope of protection or its equivalent defined by the following patent claims by doing so.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A head restraint for a vehicle seat, the head restraint comprising:
    a basic body includes a depression formed in a front surface of the basic body and having a vertically running concave curvature and a horizontally running concave curvature, and
    a foam body surrounding the basic body, wherein the foam body at a front comprises a contact surface for a head of a person using the vehicle seat, and the front surface of the basic body facing the contact surface, wherein the basic body in a region of an upper end of the contact surface comprises a ramp, which with respect to a portion of the front surface of the basic body arranged below the upper end is directed towards the front.

2. The head restraint according to claim 1, wherein the head restraint is for a backrest of a motor vehicle seat.

3. The head restraint according to claim 1, wherein the basic body is configured stiff.

4. The head restraint according to claim 1, wherein the basic body is in one piece.

5. The head restraint according to claim 1, wherein the basic body is formed of plastic.

6. The head restraint according to claim 5, wherein the basic body is formed as plastic injection molding.

7. The head restraint according to claim 1, wherein a surface of the basic body in a lower portion is arranged substantially vertically.

8. The head restraint according to claim 7, wherein the surface of the basic body in a region of the lower half of the basic body is arranged substantially vertically.

9. The head restraint according to claim 1, wherein the basic body is completely surrounded by the foam body.

10. The head restraint according to claim 1, wherein the ramp extends in width direction of the basic body in a region of its upper end.

11. The head restraint according to claim 10, wherein the ramp extends in width direction of the basic body in the region of its upper end, in a middle region of the basic body.

12. The head restraint according to claim 1, wherein a front end of the ramp runs along a horizontal direction.

13. The head restraint according to claim 1, wherein a thickness of the foam body in the region of the ramp is smaller than the thickness of the foam body in a region of the contact surface located below the ramp.

14. The head restraint according to claim 13, wherein the thickness of the foam body from the region of the ramp as far as to a lower end of the basic body increases in size.

15. The head restraint according to claim 1, wherein a thickness of the foam body between the ramp of the basic body and the contact surface of the foam body is about 8 to about 10 mm and the thickness of the foam body from the ramp as far as to a vertical middle of a surface of the basic body increases to about 12 to about 18 mm.

16. The head restraint according to claim 15, wherein the thickness of the foam body between the ramp of the basic body and the contact surface of the foam body is about 8 to about 10 mm and the thickness of the foam body from the ramp as far as to a vertical lower end of the surface of the basic body increases to about 25 to about 30 mm.

17. The head restraint according to claim 1, wherein the foam body in a region of the contact surface comprises an upper protrusion directed towards the front at a top and a lower protrusion directed towards the front at a bottom.

18. The head restraint according to claim 17, wherein a line touching the upper and lower protrusions is arranged at an angle of $\geq 0°$, wherein at an angle $>0°$ the lower protrusion is arranged in front of the upper protrusion.

19. The head restraint according to claim 1, wherein the foam body in a region of the contact surface comprises a horizontal, concave curvature and/or vertical, concave curvature adapted to a curvature of the head of a vehicle occupant in a region at a back of the head of the vehicle occupant.

* * * * *